United States Patent [19]

Smith, Jr. et al.

[11] 4,364,786
[45] Dec. 21, 1982

[54] PROCESS FOR MAKING SAFETY GLASS LAMINATES SUBJECT TO NONSYMMETRICAL THERMAL STRESS

[75] Inventors: W. Novis Smith, Jr.; Nelson P. Bolton, both of Quakertown, Pa.

[73] Assignee: Advanced Glass Systems Corp., Trumbauersville, Pa.

[21] Appl. No.: 246,662

[22] Filed: Mar. 23, 1981

[51] Int. Cl.³ ............................................. B32B 17/00
[52] U.S. Cl. ...................................... 156/99; 156/103; 156/106; 156/307.7; 156/306.6; 156/307.1; 156/306.9; 156/105; 428/425.5; 428/425.6; 428/412; 428/424.4
[58] Field of Search ............... 428/412, 429, 441, 911, 428/425.6; 156/106, 314, 310, 663, 629, 103, 99, 331.4, 312, 307.7, 104, 105, 306.6, 306.9, 307.1, 244.22; 427/302, 387

[56] References Cited

U.S. PATENT DOCUMENTS

| | | | |
|---|---|---|---|
| 3,388,032 | 6/1968 | Saunders | 161/183 |
| 3,388,034 | 6/1968 | McCombie | 161/183 |
| 3,395,069 | 7/1968 | Plueddemann | 161/193 |
| 3,406,086 | 10/1968 | Foster | 161/183 |
| 3,509,015 | 4/1970 | Wismer et al. | 428/425.6 |
| 3,622,440 | 11/1971 | Snedeker | 161/193 |
| 3,634,186 | 1/1972 | Bostick et al. | 161/183 |
| 3,652,379 | 3/1972 | White et al. | 161/183 |
| 3,666,614 | 5/1972 | Snedeker | 161/183 |
| 3,933,552 | 1/1976 | Shumaker | 156/106 |
| 3,959,533 | 5/1976 | Kitaj | 427/386 |
| 3,971,872 | 7/1976 | LeBoeuf | 428/412 |
| 3,998,985 | 12/1976 | Kitaj | 427/386 |
| 4,027,072 | 5/1977 | Molari | 428/412 |
| 4,039,719 | 8/1977 | Matsuda et al. | 428/425.6 |
| 4,085,092 | 4/1978 | Chang et al. | 428/425.6 |
| 4,103,070 | 7/1978 | Ammons | 428/425.6 |
| 4,123,588 | 10/1978 | Molari | 428/412 |
| 4,125,669 | 11/1978 | Triebel et al. | 428/412 |
| 4,126,730 | 11/1978 | Molari | 428/412 |
| 4,177,099 | 12/1979 | Radzwill | 156/106 |
| 4,204,026 | 5/1980 | LeGrand et al. | 428/91 |

OTHER PUBLICATIONS

"Selection Guide to Dow Corning Organosilane Chemicals", Dow Corning Corp., 1977.

Primary Examiner—George F. Lesmes
Assistant Examiner—E. Rollins Buffalow
Attorney, Agent, or Firm—Steele, Gould & Fried

[57] ABSTRACT

A process is disclosed for producing multi-layer laminates of glass and plastic of the type subject to nonsymmetrical thermal shear stress, such as flat or curved glass-plastic laminates or curved glass-plastic-glass sandwiches. Use of difunctional silane-treated glass and an aliphatic polyether polyurethane interlayer allows curing at temperatures low enough to minimize shear stresses which tend to cause delamination or shattering of the thin layer of glass in the finished part. The interlayer of aliphatic polyether polyurethane can be replaced by cured-in-place polyurethane having a polyether backbone, allowing processing at even lower temperatures.

16 Claims, 1 Drawing Figure

PROCESS FOR MAKING SAFETY GLASS LAMINATES SUBJECT TO NONSYMMETRICAL THERMAL STRESS

BACKGROUND OF THE INVENTION

1. Field of the Invention

This invention relates to the production of safety glass, and in particular to production of multi-layer glass-plastic laminates formed in curved or spherical shapes, for use in such products as face masks, windshields, etc.

2. Description of the Prior Art

Laminations of glass and plastic have been known to be useful as safety glass for some time. In general, a glass layer is employed for resistance to scratching and weathering. Although unlaminated glass could be provided in thicknesses sufficient to preclude shattering, such a glass would be unacceptably heavy and noticeable defraction would detract from the optical properties of such a product. A thinner glass part can be combined with a plastic layer to provide a lighter weight product having acceptable scratch and shatter resistance. If the bonding between the glass and plastic is adequate, upon impact the glass will shatter into many small parts, a large proportion of which will cling harmlessly to the plastic. Moreover, in a glass-plastic product, the plastic layer serves as a barrier to protect the users eyes from shattered glass.

In the prior art, curved safety glass forms have been produced from a sandwich of clear glass around a polycarbonate sub-layer. Generally, although not always, this bonding was achieved by use of polyvinyl butyral. An example of a flat configuration, using five laminated layers including a polyaryl carbonate layer, is disclosed in U.S. Pat. No. 3,388,032—Saunders. Saunder's safety glass consists of respective layers of glass, polyurethane, polyaryl carbonate, polyurethane, and glass. A second example, U.S. Pat. No. 3,666,614—Snedeker, et al uses an ethylene-vinyl acetate copolymer for adhesion between the glass and polycarbonate, and promotes adhesion using organo-silicon compounds incorporated into the copolymer. Both patents teach processing at elevated temperatures in the range of 392° F. (200° C.).

An alternate product to the glass/plastic/glass laminates of Saunders and Snedeker, et al uses glass on only one of the two outer faces. As applied to face masks or windshields, the exterior surface is the surface primarily exposed to weathering and scratching. Accordingly, a laminate of glass, polyurethane, and polycarbonate or polyacrylate can be coated on the inner face with a Mylar or polyester layer, rather than a second layer of the heavier glass, to decrease weight. Inasmuch as the inside face is less exposed to the elements, the nonsymmetrical arrangement is adequately resistant to scratching and chemical deterioration. Hardening of the surface of the inner plastic face can also be chemically accomplished to resist scratching and weathering. Such treatments are known in the art.

A major difficulty encountered in fabricating the nonsymmetrical multi-layer laminates of the prior art resides in the need to cure or laminate the plastic interlayers at elevated temperatures. Relatively high temperatures are required to achieve adequate bonding between the glass and plastic, and between the multiple plastic layers which make up the desired laminate. The large difference in coefficient of thermal expansion between glass and plastic introduces substantial shear stress into the curved laminate during cycling of temperature during lamination or curing, which stress is especially troublesome during the cool-down phase. These shear stresses often result in delamination or even breaking and crazing of the glass layer. The losses experienced in production of symmetrical glass/plastic/glass sandwiches are compounded in production of nonsymmetrical glass/plastic laminates. In practice, the producer of safety glass experiences higher costs due to poor product yield caused by delamination or shattering of a certain percentage of the finished parts. Such higher costs are passed on to the consumers and preclude the use of safety glass laminates in many applications where cost is crucial. As a result, short lived all-plastic face masks, goggles and other protective gear are often used where longer lived glass-plastic laminates would provide a more durable product.

The present invention teaches the use of a previously formed aliphatic polyether polyurethane sheet for the interlayer between the glass and other plastic layers. Such use allows curing at lower temperatures of about 150°–230° F. (66°–110° C.), and preferably at about 180°–220° F. (82°–104° C.). Pressure is combined with the temperature to assist bonding and to minimize shear stresses upon cooling down.

The lamination can be conveniently carried out in one step or in two steps. Where thicker glass or large pieces of glass are to be used, it is presently preferred that the aliphatic polyurethane sheet be first laminated to the glass. At a temperature of about 210° F. (99° C.), a Teflon or Nylon pressure plate is brought against the polyurethane over the glass, then cooled. Next the polycarbonate or polyacrylate sheet is placed against the polyurethane side of the newly formed glass-polyurethane laminate, centered and pressurized to about 150 psi. The temperature is brought up to about 160° F. (71° C.) for about 60 minutes, then the completed laminate is cooled. It will be appreciated that this method avoids subjecting the polycarbonate or polyacrylate sublayer to the full temperature of about 200° F. at which the bonding of the polyurethane and glass is preferably accomplished. Alternatively, polyurethane with an aliphatic polyether backbone can be formed in place as the inter-layer using a curing accelerator to produce a low temperature cure. Such a process results in improved hydrolytic stability, resistance to yellowing and improved product yield due to decreased incidence of delamination and shattering.

SUMMARY OF THE INVENTION

It is an object of this invention to produce both curved and flat safety glass laminates of high strength, low weight, and minimum production costs.

It is also an object of this invention to minimize breakage and delamination of laminated safety glass by laminating at relatively low temperatures.

It is another object of this invention to provide a transparent safety glass product of high strength using only such glass as required to provide a hard outer surface not as susceptible to scratching and weathering.

It is yet another object of this invention to bring scratch-resistant safety glass laminates to applications heretofore limited to plastic by unacceptable production cost using glass.

These and other objects are achieved by a process for producing a laminated glass-plastic product comprising the steps of cleaning a glass blank and treating the same with a difunctional silane coupling agent; stacking said blank on a sublaminate of an aliphatic polyether polyurethane over a polycarbonate layer; and, laminating said product by simultaneously heating to about 200°–220° F. (93°–104° C.) and pressurizing to about 150 psi for about one hour. The aliphatic polyether polyurethane sheet can be replaced by an uncured aliphatic polyurethane prepolymer having a polyether backbone, to be cured in place at low temperatures with a curing accelerator. For certain applications, a polycarbonate or polyacrylate sheet is laminated to the aliphatic polyurethane face of a glass-polyurethane laminate formed as a first step. Distortions occurring in the laminating process can be overcome by use of a sub-laminate having slightly greater curvature than the curvature of the glass blank. A more scratch resistant and chemical resistant laminate is formed by placing the laminate in a Nylon bag and evacuating the same before heating and pressurizing.

DETAILED DESCRIPTION OF THE PREFERRED EMBODIMENTS

Figure 1:
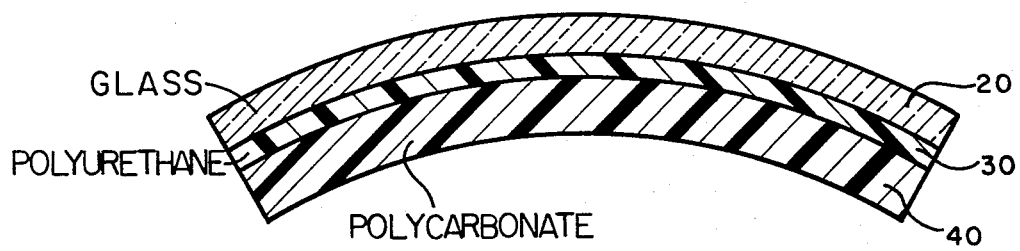
FIG. 1 is a cross-sectional view of a laminated product according to this invention.

The laminated glass-plastic product produced according to this invention is illustrated in FIG. 1. The laminate comprises glass 20, polycarbonate 40 and central layer 30 which may comprise a preformed aliphatic polyether polyurethane sheet or a polyurethane having a polyether backbone to be cured in situ. According to this invention, a laminate as depicted can be produced by treating a clean glass blank 20 with a difunctional organosilane coupling agent before laminating, and curing the entire laminate under pressure and temperature. Use of a preformed aliphatic polyurethane sheet for interlayer 30 requires curing at temperatures of about 150°–230° F. (66°–110° C.), and preferably at about 200°–220° F. (104° C.), along with pressure of about 150 psi. Such relatively low temperatures minimize shear stresses developed on cool down. Where the inter-layer is formed or cured in place with an accelerator to form polyurethane having a polyether backbone, temperatures as low as 100° F. can be employed. The prepolymer polyurethane liquid may be added before curing by injection molding and cured in place.

Several problems confront the producer of glass-plastic laminates for safety glass applications. Many safety glass uses require curved laminates as opposed to planar ones. Although such products as divers' face masks are often made from planar glass pieces, the more popular varieties used curved pieces. Curved pieces provide improved optical performance in that the wearer of such a face mask can view a larger area substantially normal to the surface of the curved glass part. No diffraction impairs viewing provided the line of sight is normal to the surface. The same consideration applies to skier's goggles, motorcyclists' helmet face plates, windshields for vehicles, and a myriad of other uses.

Although curved laminates are particularly desirable for these applications, production of curved laminates presents a number of difficulties. While minimum weight is desirable in the final product, weight can only be reduced either by use of thin laminate layers, or use of lightweight compositions. The transparency of component materials used and their resistance to scratching and chemical decomposition are also important. Glass and many plastics have suitable transparency but each has peculiar advantages and disadvantages. Glass is generally more transparent than plastic and will not yellow with age. Similarly, glass is less likely to be scratched than is plastic. The desired laminate must be transparent and scratch resistant. However, glass is subject to shattering and is relatively quite heavy.

Lamination usually requires treatment at elevated temperature. Where a single unlaminated component is used alone to form a product, e.g. a glass product, internal forces developed in temperature cycling can be dissipated or equalized by annealing. Where diverse compositions such as glass and plastic are combined in a laminate, the different co-efficients of thermal expansion between laminate layers produce shear forces that are unavoidable if changing temperatures are to be encountered. Accordingly, curing and lamination at a temperature as close as possible to the expected ambient temperature in use is desirable. In this way, the components of the laminate can be attached, yet the low temperature reduces internal shearing forces which would otherwise result on cooling, due to different coefficients of thermal expansion.

The problem of different coefficients of thermal expansion can be appreciated with reference to a flat laminate. As a glass-plastic combination is heated, both layers expand somewhat. At some elevated temperature, the plastic becomes softened and adheres to the glass. When cooled, the plastic shrinks more than the attached glass, resulting in a shear stress along the surface between the glass and plastic. If the bond is inadequate, the plastic pulls away from the glass, i.e., delamination occurs. If the bond is adequate but the glass is too thin, the shrinking plastic pulls the brittle glass into an arc, and may even cause the glass to shatter. In either eventuality, the resulting part is unacceptable.

The prior art has dealt with delamination and breakage by using thicker, stronger glass. Thicker glass can more easily resist bending and breakage, but is heavy. Moreover, the shear force has not been thereby eliminated. Rather, the force remains, and in use under mechanical and chemical stress can cause eventual delamination.

The foregoing problems are particularly troublesome where curved products are desired. Shearing forces in curved laminated products tend to separate the laminate layers or at least to dash the manufacturer's hopes of a certain curvature in the finished product. Where severe forces are encountered, a rigid thin layer such as glass can be shattered by the shear stresses. In any case, repeatably planning the exact dimensions of the finished lamination is very difficult.

The product shown in FIG. 1, and the process disclosed herein are uniquely useful for eliminating shear stresses. The method of processing, and the compositions of the laminate layers are selected to allow production at minimum temperatures, yet the strength of the adhesive bond between layers, normally a function of the temperature employed in laminating and curing, is not deteriorated. Therefore, the laminate layers may be quite thin and the finished product very light in weight. For example, skiers' goggles weighing less than 90 grams and having a glass face plate only 0.5 to 0.7 millimeters thick are possible. A high strength to weight ratio is obtained using only sufficient glass to provide a wear and chemical resistant outer surface, while lightweight polycarbonate or polyacrylate sub-layers provide impact strength. The polyurethane interlayer need only be sufficiently thick to accommodate shear stresses due to normal temperature cycling encountered by the final product in its intended use, rather than the extensive temperature cycling encountered in prior art lamination techniques, and to provide adhesion for the interface.

Three separate ways of obtaining the desired laminated product are disclosed. In a first preferred embodiment, a preformed aliphatic polyurethane sheet for the interlayer is placed between the glass and the polycarbonate or polyacrylate sub-layer. According to this process, curing is preferably accomplished at 210° F. (99° C.).

A second method is preferred for large laminates or for laminates comprising relatively thick glass. In this technique, a laminate of glass and aliphatic polyurethane is prepared initially by joining the glass and aliphatic polyurethane at a temperature of about 210° F. (99° C.) using a Teflon or Nylon pressure plate. This laminate is then cooled and later joined to a polycarbonate sheet at the lower temperature of about 130°–160° F. (55°–71° C.) and pressure of about 150 psi.

In the preferred embodiment, polyurethane with an aliphatic polyether backbone can be formed and cured in place using an accelerator, as known in the art. Acceptable accelerators include tin compounds or amines in concentration of about 0.1%. Use of a polyurethane with an aliphatic polyether backbone improves the hydrolytic stability of the interlayer as well as resistance to yellowing in the final product. Preferably, according to this embodiment the polyurethane is formed in situ with an aliphatic diisocyanate. The polyurethane may be formed by injection molding between the glass and polycarbonate or polyacrylate sub-layer and cured at temperatures as low as room temperature. Of course, lower temperature curing will take a longer time than higher temperature curing. Similarly, a higher accelerator concentration will speed curing. It is presently preferred that curing according to this embodiment be accomplished under pressure and at about 100° F. (38° C.), at which temperature the cure is complete in about an hour.

The polyurethane inter-layer provides the necessary adhesion between glass and polycarbonate or polyacrylate sublayer as well as the elastomeric properties required to overcome the thermal shear stresses that occur between the glass and the polycarbonate or polyacrylate.

The unique process is summarized as follows. A curved glass blank of very slightly more than the desired curvature is treated with hydrogen fluoride or ammonia fluoride etchant to clean the surface of grease or other foreign material, and to microscopically roughen the surface. The etchant should be removed before noticeable etching occurs in order that the finished product be as transparent as possible. The surface is then treated with a difunctional organo-silane coupling agent such as Dow E-6020 at 0.2% in isopropanol. The glass blank is then heated to about 150° F. and maintained at that temperature for about one hour to thoroughly dry it. (Water or alcohol remaining on the blank would deteriorate adhesion properties). The blank is then cooled. This silane treatment improves the adhesion properties of the glass blank. One end of the silane molecule is chemically bonded to the glass, leaving the other end of the silane molecule to be chemically bonded to the interlayer of polyurethane. The curved glass is then laid over the piece of aliphatic polyurethane sheet formed from a polyether backbone and an aliphatic diisocyanate, which in turn covers a piece of curved polycarbonate. The curvature of the glass blank is preferably slightly greater than the curvature of the polycarbonate (or polyacrylate) to provide a spring-like effect which holds the layers together. This extra pressure due to slightly different curvature also tends to compensate for distortions introduced during lamination. The optimum amount of difference in curvature is dependent on the thickness of the respective layers. With reference to the thicknesses disclosed herein, and in laminates of faceplate size, the difference in radius of curvature amounts to 2–5 mm. The curved sandwich is placed inside a Nylon or similar bag which is evacuated and thus closed around the glass/polyurethane/polycarbonate stack. The evacuated bag holding the laminate layers is placed in an autoclave and heated to about 210° F. (99° C.) while under 150 psi pressure and maintained for one hour. After cooling and removal, a transparent curved laminate is obtained suitable for face masks and windshields.

The unique usefulness of this invention may be appreciated by examining the action of the glass, difunctional silane coupler, polyurethane and polycarbonate during lamination, and particularly the action at the interfaces between the respective layers. It will be appreciated that the prior art discloses use of an elastomeric layer between the glass and polycarbonate, to cushion the laminate from the shear stress developed during the temperature cycling required to achieve adequate bonding. This invention also employs an elastomeric interlayer, i.e., the polyurethane. Nevertheless, in the present invention employing lower temperatures, shear stresses are minimized in any event. Accordingly, the polyurethane elastomeric interlayer is not as heavily stressed, and may be thinner than in the prior art. As applied to face masks, preferred resulting thicknesses are about 0.5 to 1.0 mm glass, 0.5 mm polyurethane, and 1 to 2 mm polycarbonate.

Before heating the laminate, the disclosed procedure causes the difunctional silane coupler to become molecularly bonded to the glass at one end of the silane molecule. The heating and pressure of lamination causes the opposite end of the silane molecule to be bonded to the polyurethane. Thus molecular bonds securely attach the elastomeric layer to the glass. During heating and pressurizing, the respective plastic laminate layers are also softened and pressed against one another and against the glass. Thus the plastic/plastic interfaces are securely joined by diffusion or cross-polymerization at the junctions between the plastic layers. In addition to the secure bonds, the fact that the process employs relatively low temperatures avoids temperature cycling which would stress the bonds. The end result is a strong laminate that does not delaminate, shatter or bend, even in nonsymmetrical or curved products.

The foregoing compositions can be combined in other sequences, as required for particular applications. For example, uses especially subject to chemical exposure would advantageously require glass on both outer surfaces of the laminate. Employing the disclosed process, such a glass sandwich could also be formed. A suitable laminate would comprise respective layers of glass/aliphatic polyether polyurethane/polycarbonate/aliphatic polyether polyurethane/glass. Such an embodiment is quite resistant to chemical decomposition and scratching. Nevertheless, employing this process, the finished product is light weight and strong.

Another variation of this process that yields excellent results is use of polymethylmethacrylate in place of the polycarbonate or polyacrylate base layer of plastic (or center layer in a glass/plastic/glass sandwich). Polymethylmethacrylate (PMMA), like polycarbonate or polyacrylate, is securely joined to the polyurethane layer by diffusion or cross-polymerization, and the polyurethane is securely joined to the glass by molecular bonding via silane molecules.

Many other variations on this inventive concept will now be obvious to those of ordinary skill in the art. Reference should be made to the appended claims, rather than the foregoing Specification, as defining the true scope of this invention.

I claim:

1. A process for producing a non-symmetrical laminate of glass and plastic comprising the steps of:
    (a) treating a glass blank with a difunctional silane coupling agent;
    (b) forming a first laminate by placing the glass blank against a sheet of an aliphatic polyether polyurethane, and heating to about 200°–220° F.; and,
    (c) forming a second laminate of said initial laminate and a plastic sub-layer by placing sub-layer against the aliphatic polyether polyurethane, and simultaneously heating to about 130°–160° F. and pressurizing to about 150 psi for about one hour, whereby non-symmetrical thermal shear stresses between the first and second laminates are minimized.

2. The process of claim 1, wherein said plastic sublayer is a transparent polycarbonate.

3. The process of claim 1, wherein said plastic sublayer is a transparent polyacrylate.

4. The process of claim 2 or 3, wherein said glass blank is curved, and said plastic sublayer is curved to a lesser curvature, whereby said glass blank and said plastic sub-layer are held in mechanical contact by a spring effect therebetween.

5. The process of claim 4, further comprising enclosing said product in a mylar bag and evacuating the bag before said curing step, whereby the product is enclosed in a protective coating of mylar.

6. The process of claim 4, further comprising enclosing said product in a nylon bag and evacuating the bag before said curing step, whereby the product is enclosed in a protective coating of nylon.

7. The process of claim 4, further comprising treating and forming a second glass-polyurethane initial laminate from a second glass blank and second polyurethane sheet, and placing said second initial laminate against the plastic sublayer before forming the second laminate, whereby a glass-plastic-glass laminate is produced.

8. The process of claim 1, wherein the glass blank is curved.

9. A process for producing a non-symmetrical laminate of glass and plastic comprising the steps of:
    (a) treating a glass blank with a difunctional silane coupling agent;
    (b) injecting an uncured aliphatic polyurethane having a polyether backbone and a curing accelerator between said glass blank and a plastic sublayer; and,
    (c) curing said product by heating to about 100° F. for about one hour, whereby non-symmetrical thermal shear stresses are minimized.

10. The process of claim 9, wherein said plastic sublayer is a transparent polycarbonate.

11. The process of claim 9, wherein said plastic sublayer is a transparent polyacrylate.

12. The process of claims 10 or 11, wherein said glass blank is curved, and said plastic sub-layer is curved to a lesser curvature, whereby said glass blank and said plastic sub-layer are held in mechanical contact by a spring effect therebetween.

13. The process of claim 12, further comprising enclosing in a mylar bag and evacuating the bag before said curing step, whereby the product is enclosed in a protective coating of mylar.

14. The process of claim 12, further comprising enclosing in a nylon bag and evacuating the bag before said curing step, whereby the product is enclosed in a protective coating of nylon.

15. The process of claim 12, further comprising treating and injecting a second glass blank and uncured polyurethane before curing, whereby a glass-plastic-glass laminate is produced.

16. The process of claim 9, wherein the glass blank is curved.

* * * * *